April 27, 1965    C. R. GALLANT ET AL    3,180,922
THROUGH-BOLT BUS SUPPORT FOR METAL CLAD SWITCHGEAR
Filed July 16, 1962     2 Sheets-Sheet 1
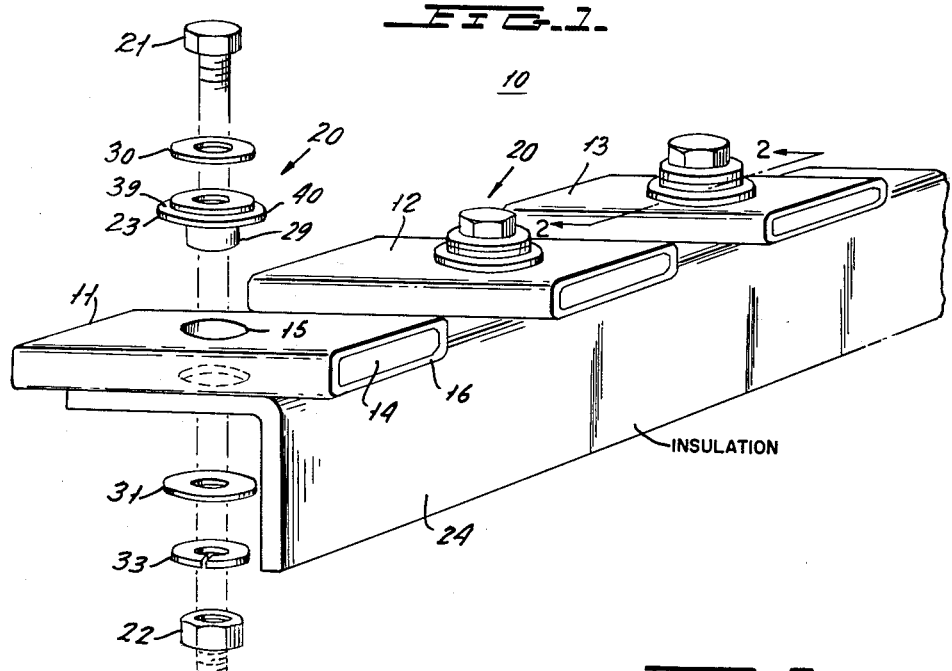
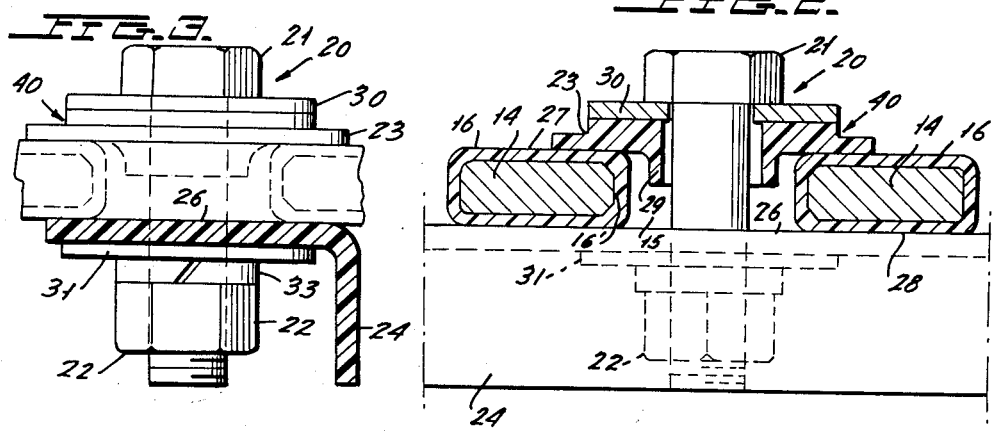
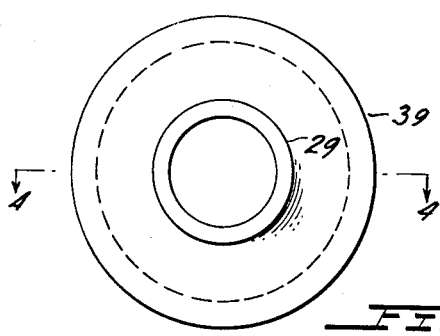
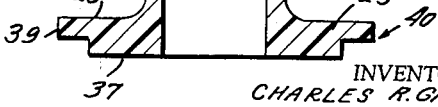
INVENTORS
CHARLES R. GALLANT
JOHN J. CUORATO
BY
OSTROLENK, FABER, GERB & SOFFEN
ATTORNEYS April 27, 1965     C. R. GALLANT ET AL     3,180,922
THROUGH-BOLT BUS SUPPORT FOR METAL CLAD SWITCHGEAR
Filed July 16, 1962     2 Sheets-Sheet 2

INVENTORS
CHARLES R. GALLANT
JOHN J. CUORATO
BY
OSTROLENK, FABER, GERB & SOFFEN
ATTORNEYS

United States Patent Office 3,180,922
Patented Apr. 27, 1965

3,180,922
THROUGH-BOLT BUS SUPPORT FOR METAL CLAD SWITCHGEAR
Charles R. Gallant, Beach Haven Park, N.J., and John J. Cuorato, Springfield, Pa., assignors to I-T-E Circuit Breaker Company, Philadelphia, Pa., a corporation of Pennsylvania
Filed July 16, 1962, Ser. No. 210,006
13 Claims. (Cl. 174—70)

Our invention relates to a bus structure, and more particularly to a positive bus support for a dip-coated insulated bus bar, as used in metal-clad switch gear.

In many electrical installations the use of exposed bus bars must be avoided. For example, according to the standards of the electrical industry, it is required that all bus bars used in metal-clad switch gear be covered with insulation. A support structure for an insulated bus should preferably provide sufficient mechanical connection to the equipment structure without exposing any portion of the bare bus. Generally the best bus support has been of the through-bolt bus type, in which aperture openings in the bus are used to fasten the bus to the equipment frame; the through-bus apertures are appropriately spaced along the length of the bus to provide the necessary support.

The presently practiced through-bolt bus support arrangement for insulated bus typically position a slip-on insulator tube over the bare bar, the inner dimensions of the tube snugly corresponding to the outer dimensions of the bus. The slip-on tube contains apertures which are positoned in alignment with respect to similarly spaced apertures extending through the bare bus. The aligned apertures are positioned to receive bolts for fastening the bus to the equipment structure. Such an arrangement disadvantageously has an uninsulated bus aperture, thereby creating an exposed crack in the otherwise insulated bus.

Another support presently being practiced for insulated bus is to place a clamp around the slip-on tube and then tighten such a clamp to grasp the bus. Such an arrangement does not provide the substantial support obtainable with a through-bolt support and additionally presents a slippage problem. The support of our invention is advantageously of the through-bus type but does not expose any portion of the bare bus, as in the prior art. The bus of our invention is insulated by the dipped or coating process after the drilling of the support receiving apertures. Thus, a coat of insulation is applied about the inner area of the through-apertures. These internally insulated apertures permit through-bus bolting without breaking the continuous insulation of the bus bar. To further add to the surety of continuity of bus insulation, the support structure assembly of our invention comprises a plurality of insulated members, interposed between the insulated bus bar surfaces and the metallic members of the support structure. These insulators protect the dipped coat of the insulated bus from any sharp threads or edges of the hardware, and further provide increased track resistance.

One form which our invention may take contemplates the use of spaced parallel-disposed insulating members abutting the opposite surfaces of the insulated bus to be supported. These insulating members contain apertures which are placed in alignment with bolt receiving apertures of the bus. An additional insulator member is also disposed within the bus bar aperture, between the insulated inner aperture area and the fastening bolt. As a further aspect of our invention washers are interposed between the contact surfaces of the bolt, and the insulating members to provide for more even force distribution.

As another aspect of our invention, one or more of the insulating members adjacent the bus surfaces are formed of a polyester glass material for increased track resistance.

As an additional aspect of our invention, the insulating member disposed within the bus bar aperture is incorporated with one of the insulating members to form a composite insulator, to facilitate alignment of components, thereby simplifying assembly.

It is therefore seen that the basic concept of our invention resides in a bus structure utilizing a fully insulated bus bar and which supports said bus bar in a through-bus-bolt arrangement without rupturing the continuous insulated covering of the bus bar.

It is therefore a primary object of our invention to provide a through-bus support for an insulated bus which does not require the exposure of any bare bus.

Another object is to provide an insulated bus support, having a plurality of insulator components in proximity to the insulated bus and interposed between insulated bus surfaces and the metallic support members.

An additional object is to provide a through-bus-bolt support structure which incorporates a plurality of polyester glass members interposed between the bus and the metallic members of the support structure.

A further object is to provide such a through-bus-bolt support structure including a polyester glass composite insulator which both abuts one bus surface and extends into the through-bus aperture.

Still another object is to provide a support structure for a continuously insulated bus bar comprising mating insulator members having spaced parallel planar surfaces disposed to tightly receive such a bus bar and fastening means extending through aligned apertures of the bus bar and the mating insulating members.

Still an additional object is to provide such a bus bar support assembly which further includes an insulating member interposed between the fastening means and the internally insulated aperture area of such a bus structure.

Still a further object is to provide a positive bus support for the insulated bus of metal-clad switch gear which positions such an insulated bus between mating insulated surfaces and includes a fastening means extending through an insulated aperture opening of the bus, to provide a through-bus-bolt support to the equipment frame without exposing any bare bus.

These as well as other object of our invention will become apparent from the following descriptions of the accompanying drawings in which:

FIGURE 1 is a perspective view of the bus bar portion of a metal-clad switch gear assembly supported in accordance with the teachings of our invention, with the support assembly shown exploded.

FIGURE 2 is a cross-section along line 2—2 of FIGURE 1, which illustrates in end view the assembled bus bar support of a preferred embodiment of our invention.

FIGURE 3 is an end view of FIGURE 2 also showing a section of member 24.

FIGURES 4 and 5 are a side elevation partially sectionalized and plan view respectively of the unitary washer and bushing insulated support member of our invention.

Figure 6:
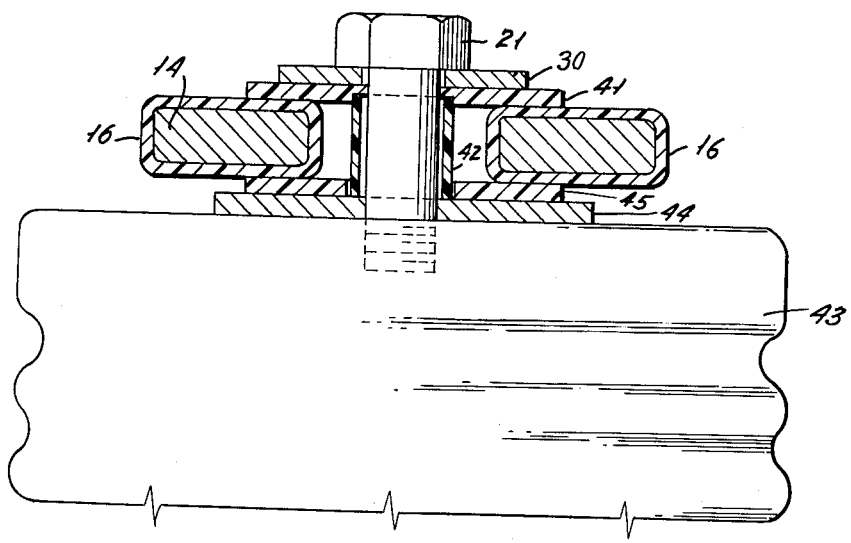
FIGURE 6 is an end view partially sectionalized of a modified insulated bus support, constructed in accordance with the teachings of our invention.

Referring initially to FIGURE 1, the bust compartment 10 of the switch gear assembly contains individual phase buses 11, 12 and 13. Bus campartment 10 might also include appropriate interphase isolating components (not shown). Each of the buses is formed of an inner conductive portion 14 constructed of an appropriate conductive material, e.g. copper. Aperture means 15 are provided along the length of each of the aforesaid bus bars to provide for through-bolting to an appropriate support structure of the bus compartment. Aperture means 15 are spaced to provide adequate support of the bus, and may typically be spaced in 4" intervals. Insulated covering 16 continuously covers bare bus 14. Insulation covering 16 is preferably comprised of an appropriate epoxy composition to provide high dielectric strength and is applied to bus 14 by a dip or coating process after the drilling of apertures 15. Thus an insulated coating 16' will be applied along the internal areas of apertures 15.

The bus support assembly 20 is illustratively shown connected to insulated angle (or channel) 24 constructed, e.g., from a high dielectric polyester glass material or from porcelain. It is naturally understood that various other equivalent structures for connecting support assembly 20 to the equipment frame may be practiced without departing from the spirit or scope of our invention. Support structure assembly 20 is through-connected to internally insulated aperture 15 by a fastening means such as bolt and nut assembly 21, 22. Insulated member 23 and angle 24 have spaced parallel planar surfaces 25, 26 respectively. These surfaces are separated a distance corresponding to the width of the bus and in an abutting relationship with opposite surfaces 27, 28 thereof. One or both of insulating members 23, 24 is preferably constructed of a high dielectric polyester glass material for increased track resistance. Member 24 is illustratively shown as such a glass angle or channel which is appropriately connected to the frame of the metal-clad switch gear bus compartment. Alternatively, member 24 may be a porcelain insulator having a metallic cap appropriately internally threaded to receive bolt 21, such as the class A 30/15 KV. insulator, as shown in FIGURE 6 in conjunction with a modified embodiment of our invention.

A further insulating member 29 is shown extending into insulated aperture 15 and interposed between the threads of bolt 21 and the dipped insulated covering 16'. Insulator means 29 is preferably shown as an extension of insulator member 23 to thereby form a composite structure 40. Such a composite structure facilitates centering of the support members thereby simplifying assembly. Metallic members 30, 31 are preferably interposed between the bolt 21, lockwasher 33 and insulator members 23, 24. The use of such means advantageously evenly distributes the force exerted by bolt and nut 21, 22 to insulator means 23, 24. Member 30 is preferably a washer of a diameter corresponding to insulator surface 37. Member 31 may be a similar washer abutting member 24. Lip 39 of composite insulator 40 is provided to distribute the contact force over a greater bus area, and to facilitate the use of composite insulator 40 in a spreader, as will be subsequently set forth in conjunction with FIGURE 7.

FIGURE 6 shows a somewhat different embodiment of our invention which uses a separate polyester glass washer 41 and bushing 42 in place of composite insulator 40. Also insulator bracket 24 has been replaced with porcelain insulator 43, having metallic cap 44 appropriately tapped to receive fastening bolt 21. Polyester glass washer 45, which may be similar to 41, is interposed between the bus and metallic insulator cap 44. Bushing 42 and insulator washer 41, 45 are of corresponding diameters to preferably contain bushing 42 within the oppositely disposed insulator washers.

Figure 7:
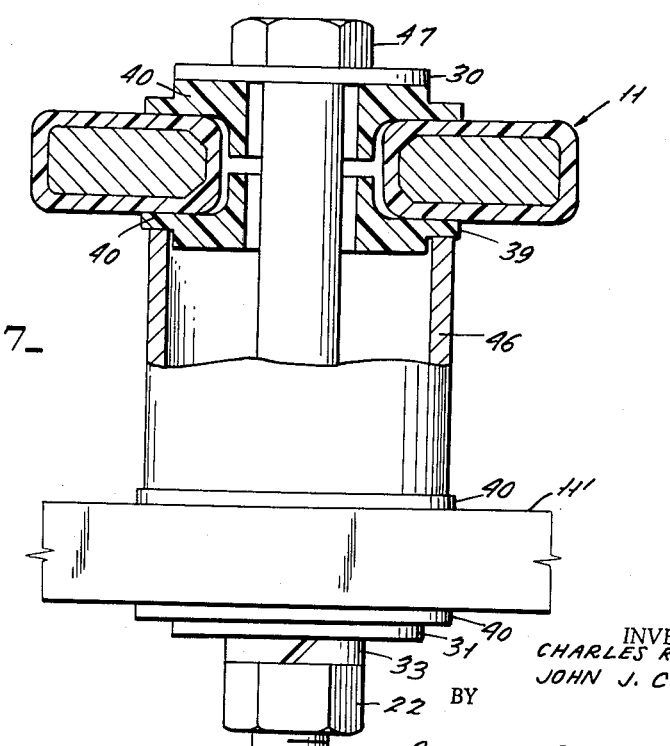
FIGURE 7 is a partially cross-sectioned view, showing the use of the unitary insulated washer in conjunction with a pipe spacer to act as a spreader.

FIGURE 7 shows the manner in which the unitary insulated member 40 of our invention may be used in conjunction with pipe spacer 46 to act as a separator between bus straps 11, 11'. Buses 11, 11' may typically be parallel connected buses of a single phase. A pair of unitary insulator members 40 are disposed at opposite surfaces of bus 11. Pipe spacer 46 has a length corresponding to the desired separation of buses 11, 11', and an internal diameter and wall thickness adapted to be supported on lip 39. Bus 11' is shown as being similarly disposed between a pair of insulator members 40. Bolt 47 is preferably similar to bolt 21, but of a sufficiently greater length. Bolt 47 extends through the aligned bus apertures, and is appropriately fastened with nut 22 and washers 30, 31 and lock-washer 33, in the manner set forth above in FIGURES 1–3.

Alternatively, bus bars 11–11' may be separated by the analogous interconnection of individual insulator washers 41 and bushings 42 instead of unitary insulator 40.

It is thus seen that we have provided a through-bolt support structure for an insulated bus, which avoids the prior rupturing of the insulated surface to expose any bare bus, and is constructed in such a manner as to insure against such subsequent rupture. This structure provides substantial support of the insulated bus, requires a minimum of parts and space, provides increased track resistance, and avoids the slippage problem of the prior art clamp-on support.

In the foregoing description, this invention has been described with a preferred illustrative embodiment. Since many variations and modifications will now become apparent to those skilled in the art, we prefer not to be limited to the specific disclosure herein, but only by the appended claims.

The embodiments of the invention in which an exclusive privilege or property is claimed are defined as follows.

1. A bus structure comprising: an insulated bus bar and bus bar support means; said insulated bus bar having first and second longitudinally extending external surfaces; aperture means extending through said bus bar between said first and second surfaces; insulator means covering said first and second surfaces and the internal area of said aperture; said support means extending through said aperture means and being fixedly fastened to said first and second bus bar surfaces without rupturing said insulator means; said support means comprising a first and second insulator member abutting said first and second bus bar surfaces respectively, and a third insulator member extending into said aperture means.

2. A bus structure comprising: an insulated bus bar and bus bar support means; said insulated bus bar having first and second longitudinally extending external surfaces; aperture means extending through said bus bar between said first and second surfaces; insulator means covering said first and second surfaces and the internal area of said aperture; said support means extending through said aperture means and being fixedly fastened to said first and second bus bar surfaces without rupturing said insulator means; said support means comprising a first and second insulator member abutting said first and second bus bar surfaces respectively, a third insulator member extending into said aperture means, and fastening means extending through said aperture means; said third insulator member interposed between said fastening means and said internal area of said aperture means; said fastening means operatively positioned to urge each of said first and second insulator members towards its respective abutting bus bar surface for firm engagement therebetween.

3. A bus structure comprising: an insulated bus bar and bus bar support means; said insulated bus bar having first and second longitudinally extending external surfaces; aperture means extending through said bus bar between said first and second surfaces; insulator means covering said first and second surfaces and the internal area of said aperture; said support means extending through said aperture means and being fixedly fastened to said first and second bus bar surfaces without rupturing said insulator means; said support means comprising a first and second insulator member abutting said first and second bus bar surfaces respectively, a third insulator member extending into said aperture means, and fastening means extending through said aperture means; said third insulator member interposed between said fastening means and said internal area of said aperture means; said fastening means operatively positioned to urge each of said first and second insulator members towards its respective abutting bus bar surface for firm engagement therebetween; said fastening means comprising a bolt and a mating internally threaded member; separator means disposed between the contact surface of said fastening means and at least one of said first and second insulator members, whereby the force exerted by said fastening means is more evenly distributed to said insulator members.

4. A bus structure comprising: an insulated bus bar and bus bar support means; said insulated bus bar having first and second longitudinally extending external surfaces; aperture means extending through said bus bar between said first and second surfaces; insulator means covering said first and second surfaces and the internal area of said aperture; said support means extending through said aperture means and being fixedly fastened to said first and second bus bar surfaces without rupturing said insulator means; said support means comprising a first and second insulator member abutting said first and second bus bar surfaces respectively, a third insulator member extending into said aperture means, and fastening means extending through said aperture means; said third insulator member interposed between said fastening means and said internal area of said aperture means; said fastening means operatively positioned to urge each of said first and second insulator members towards its respective abutting bus bar surface for firm engagement therebetween; said fastening means comprising a plurality of metallic members including a bolt and nut assembly; said insulator members separating said metallic members from said insulated bus bar and aperture means, thereby protecting said insulator means from sharp portions of said metallic members.

5. A bus structure comprising: an insulated bus bar and bus bar support means; said insulated bus bar having first and second longitudinally extending external surfaces; aperture means extending through said bus bar between said first and second surfaces; insulator means covering said first and second surfaces and the internal area of said aperture; said support means extending through said aperture means and being fixedly fastened to said first and second bus bar surfaces without rupturing said insulator means; said support means comprising a first and second insulator member abutting said first and second bus bar surfaces respectively, and a third insulator member extending into said aperture means; said first and third insulator members being a composite insulator comprising a first portion adapted to extend into said aperture means, and a second portion adapted to abut said first bus bar surface at the region surrounding said aperture means; said composite insulator formed of a track-resistant material.

6. A bus structure comprising: an insulated bus bar and bus bar support means; said insulated bus bar having first and second longitudinally extending external surfaces; aperture means extending through said bus bar between said first and second surfaces; insulator means covering said first and second surfaces and the internal area of said aperture; said support means extending through said aperture means and being fixedly fastened to said first and second bus bar surfaces without rupturing said insulator means; said support means comprising a first and second insulator member abutting said first and second bus bar surfaces respectively, and a third insulator member extending into said aperture means; at least one of said first and second insulator members formed of a track-resistant polyester glass.

7. A bus structure comprising: an insulated bus bar and bus bar support means; said insulated bus bar having first and second longitudinally extending external surfaces; aperture means extending through said bus bar between said first and second surfaces; insulator means covering said first and second surfaces and the internal area of said aperture; said support means extending through said aperture means and being fixedly fastened to said first and second bus bar surfaces without rupturing said insulator means; said support means comprising a first and second insulator member abutting said first and second bus bar surfaces respectively, and a third insulator member extending into said aperture means; said first and third insulator members being a composite insulator comprising a first portion adapted to extend into said aperture means, and a second portion adapted to abut said first bus bar surface at the region surrounding said aperture means; said composite insulator and said second insulator member formed of a track-resistant polyester glass.

8. A bus structure comprising: an insulated bus bar and bus bar support means; said insulated bus bar having first and second longitudinally extending external surfaces; aperture means extending through said bus bar between said first and second surfaces; insulator means covering said first and second surfaces and the internal area of said aperture; said support means extending through said aperture means and being fixedly fastened to said first and second bus bar surfaces without rupturing said insulator means; said support means comprising a first and second insulator member abutting said first and second bus bar surfaces respectively, a third insulator member extending into said aperture means, and fastening means extending through said aperture means; said third insulator member interposed between said fastening means and said internal area of said aperture means; said fastening means operatively positioned to urge each of said first and second insulator members towards its respective abutting bus bar surface for firm engagement therebetween; said fastening means comprising a bolt and a mating internally threaded member; separator means disposed between the contact surface of said fastening means and at least one of said first and second insulator members, whereby the force exerted by said fastening means is more evenly distributed to said insulator members; said first and third insulator members being a composite insulator comprising a first portion adapted to extend into said aperture means, and a second portion adapted to abut said first bus bar surface at the region surrounding said aperture means; said composite insulator and said second insulator member formed of a track-resistant polyester glass.

9. In a metal-clad switchgear assembly including an insulated bus bar; said bus bar having first and second longitudinally extending spaced parallel surfaces; transverse aperture means extending between said first and second surfaces; insulator means covering said first and second surfaces and the internal area of said aperture means; said aperture means operatively positioned to receive support means to fixedly fasten said bus bar to an equipment support structure; said support means comprising a first and second insulator member, each having a planar surface abutting said first and second bus bar surfaces respectively; first fastening means extending through said aperture means; insulator means annularly positioned about at least a portion of said first fastening means disposed in said aperture means; second fastening means securing said support means to said equipment support structure.

10. In a metal-clad switchgear assembly including an insulated bus bar; said bus bar having first and second longitudinally extending spaced parallel surfaces; transverse aperture means extending between said first and second surfaces; insulator means covering said first and second surfaces and the internal area of said aperture means; said aperture means operatively positioned to receive support means to fixedly fasten said bus bar to an equipment support structure; said support means comprising a first and second insulator member, each having a planar surface abutting said first and second bus bar surfaces respectively; first fastening means extending through said aperture means; insulator means annularly positioned about at least a portion of said first fastening means disposed in said aperture means; second fastening means securing said support means to said equipment support structure; at least one of said first and second insulator members formed of a track-resistant polyester glass.

11. In a metal-clad switchgear assembly including an insulated bus bar; said bus bar having first and second longitudinally extending spaced parallel surfaces; transverse aperture means extending between said first and second surfaces; insulator means covering said first and second surfaces and the internal area of said aperture means; said aperture means operatively positioned to receive support means to fixedly fasten said bus bar to an equipment support structure; said support means comprising a first and second insulator member, each having a planar surface abutting said first and second bus bar surfaces respectively; first fastening means extending through said aperture means; insulator means annularly positioned about at least a portion of said first fastening means disposed in said aperture means; second fastening means securing said support means to said equipment support structure; said fastening means operatively positioned to urge each of said first and second insulator members towards its respective abutting bus bar surface for firm engagement therebetween; said fastening means comprising a plurality of metallic members including a bolt and nut assembly; said insulator members separating said metallic members from said insulated bus bar and aperture means.

12. In a metal-clad switchgear assembly including an insulated bus bar; said bus bar having first and second longitudinally extending spaced parallel surfaces; transverse aperture means extending between said first and second surfaces; insulator means covering said first and second surfaces and the internal area of said aperture means; said aperture means operatively positioned to receive support means to fixedly fasten said bus bar to an equipment support structure; said support means comprising a first and second insulator member, each having a planar surface abutting said first and second bus bar surfaces respectively; first fastening means extending through said aperture means; third insulator member annularly positioned about at least a portion of said first fastening means disposed in said aperture means; second fastening means securing said support means to said equipment support structure; said fastening means operatively positioned to urge each of said first and second insulator members towards its respective abutting bus bar surface for firm engagement therebetween; said fastening means comprising a plurality of metallic members including a bolt and nut assembly; said insulator members separating said metallic members from said insulated bus bar and aperture means; said first and third insulator members being a composite insulator comprising a first portion adapted to extend into said aperture means, and a second portion adapted to abut said first bus bar surface at the region surrounding said aperture means; said composite insulator and said second insulator member formed of a track-resistant polyester glass.

13. A bus structure comprising a plurality of insulated bus bars and a bus spreader assembly; each of said bus bars having first and second longitudinally extending surfaces; the longitudinal surfaces of said bus bars being disposed in substantially parallel extending planes; aperture means extending between said first and second surfaces, insulator means covering said first and second surfaces and the internal area of said aperture means; the aperture means of each of said plurality of bus bars disposed in relative alignment; said bus spreader assembly comprising a pair of insulator members abutting the first and second surfaces of each of said bus bars, spacing means disposed between insulator members of adjacent bus bars and fastening means urging said insulator members towards each other; said fastening means including a longitudinal member extending through said aligned bus bar aperture means, said insulator members and said separator means; said insulator means including a portion disposed between said longitudinal member and the internal area of said aperture means.

References Cited by the Examiner
UNITED STATES PATENTS

| | | | |
|---|---|---|---|
| 1,999,137 | 4/35 | Flewelling | 174—117 |
| 2,269,233 | 1/42 | Specht | 174—16 |
| 2,287,502 | 6/42 | Togesen et al. | 339—22 |
| 2,733,289 | 1/56 | Warren et al. | 174—99 |
| 2,932,686 | 4/60 | Herrmann | 174—99 |

JOHN F. BURNS, *Primary Examiner.*

JOHN P. WILDMAN, LARAMIE E. ASKIN,
*Examiners.*